(12) United States Patent
Oh

(10) Patent No.: US 7,068,178 B2
(45) Date of Patent: Jun. 27, 2006

(54) COMBINATION OF A SEATING SYSTEM AND A SHARED SENSOR

(75) Inventor: Pahngroc Oh, Ann Arbor, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 465 days.

(21) Appl. No.: 09/995,021

(22) Filed: Nov. 27, 2001

(65) Prior Publication Data

US 2002/0173892 A1 Nov. 21, 2002

Related U.S. Application Data

(60) Provisional application No. 60/253,317, filed on Nov. 27, 2000.

(51) Int. Cl.
*G08B 21/00* (2006.01)

(52) U.S. Cl. .................... 340/667; 340/457.1; 340/438; 701/49

(58) Field of Classification Search ............... 340/667, 340/438, 457.1, 426.32, 441; 296/63; 180/271, 180/282; 701/49, 45
See application file for complete search history.

(56) References Cited

U.S. PATENT DOCUMENTS

| | | | | |
|---|---|---|---|---|
| 3,452,834 A | | 7/1969 | Gaut ............................ 180/82 |
| 4,722,550 A | * | 2/1988 | Imaoka et al. ............... 280/727 |
| 4,900,079 A | | 2/1990 | Obara et al. ................ 296/65.1 |
| 4,924,162 A | | 5/1990 | Sakamoto et al. ........... 318/569 |
| 5,130,622 A | | 7/1992 | Takizawa et al. ............ 318/265 |
| 5,263,765 A | | 11/1993 | Nagashima et al. ...... 297/284.6 |
| 5,320,409 A | | 6/1994 | Katoh et al. .............. 297/284.6 |
| 5,490,706 A | | 2/1996 | Totani ......................... 296/68.1 |
| 5,536,059 A | * | 7/1996 | Amirouche .............. 296/65.02 |
| 5,556,160 A | | 9/1996 | Mikami ...................... 297/216.1 |
| 5,567,006 A | | 10/1996 | McCarthy ............... 297/216.15 |
| 5,652,704 A | * | 7/1997 | Catanzarite ................... 701/48 |
| 5,707,109 A | * | 1/1998 | Massara et al. ........... 297/284.9 |
| 5,743,591 A | | 4/1998 | Tame ....................... 297/216.1 |
| 5,927,427 A | * | 7/1999 | Sewell et al. ................ 180/273 |
| 5,975,508 A | | 11/1999 | Beard ......................... 267/136 |
| 6,024,378 A | | 2/2000 | Fu .............................. 280/735 |
| 6,037,731 A | | 3/2000 | Fruehauf et al. ............. 318/468 |
| 6,056,079 A | * | 5/2000 | Cech et al. ................. 180/273 |
| 6,059,253 A | * | 5/2000 | Koutsky et al. ............. 248/550 |
| 6,088,642 A | | 7/2000 | Finkelstein et al. ........... 701/49 |
| 6,120,082 A | | 9/2000 | Vandermolen ............. 296/68.1 |
| 6,122,568 A | | 9/2000 | Madau et al. ................... 701/1 |
| 6,182,783 B1 | | 2/2001 | Bayley ....................... 180/282 |
| 6,193,297 B1 | | 2/2001 | Vandermolen ............. 296/68.1 |
| 6,691,015 B1 | * | 2/2004 | Levine ......................... 701/70 |

OTHER PUBLICATIONS

PCT Publication, WO 00/12350, Mar. 9, 2000.
PCT Publication WO 00/12350, Mar. 9, 2000.

* cited by examiner

*Primary Examiner*—Phung T. Nguyen
(74) *Attorney, Agent, or Firm*—Brinks Hofer Gilson & Lione

(57) ABSTRACT

A seating system and a shared sensor is described and shown. The seating system includes a seat section and a back section, adjustable bolsters coupled to the seat section and the back section, and a control unit coupled to the adjustable bolster. The shared sensor is coupled to the control unit of the seating system and to another system in the vehicle.

16 Claims, 2 Drawing Sheets

COMBINATION OF A SEATING SYSTEM AND A SHARED SENSOR

CROSS-REFERENCE TO PRIOR APPLICATIONS

The present invention claims priority to U.S. provisional application Ser. No. 60/253,317, filed Nov. 27, 2000 and entitled "Dynamic Adjustable Seating".

TECHNICAL FIELD

The present invention generally relates to a seating system having an adjustable bolster and, more particularly, to a seating system having an adjustable bolster activated by a control unit that receives vehicle data, such as lateral acceleration data, steering wheel angle, and yaw rate data.

BACKGROUND

Although appearing in more printed publications than in actual vehicles, the concept of a seating system having an automatically adjustable bolster activated by a control unit based upon particular parameters is well known. U.S. Pat. No. 4,924,162, which is hereby incorporated in its entirety by this reference, discloses such seating system. Each of the seating systems having an automatically adjustable bolster, however, rely upon a sensor to provide vehicle data, such as lateral acceleration data. The sensor of the seating systems, in fact, may duplicate the function of another sensor for another system in the vehicle. This duplication adds unnecessary weight, cost, and complexity to the vehicle.

DESCRIPTION OF THE PREFERRED EMBODIMENT

The following description of the preferred embodiment is not intended to limit the invention to this preferred embodiment, but rather to enable any person skilled in the art of seating systems to make and use this invention.

Figure 1:
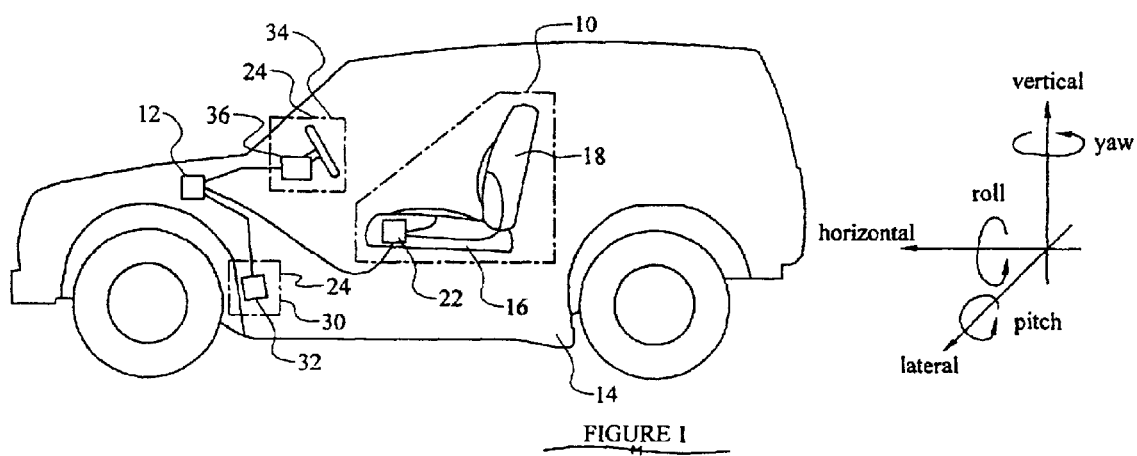
FIG. 1 is a schematic view of a combination of a seating system and a shared system of the preferred embodiment, shown within a vehicle.
Figure 2:
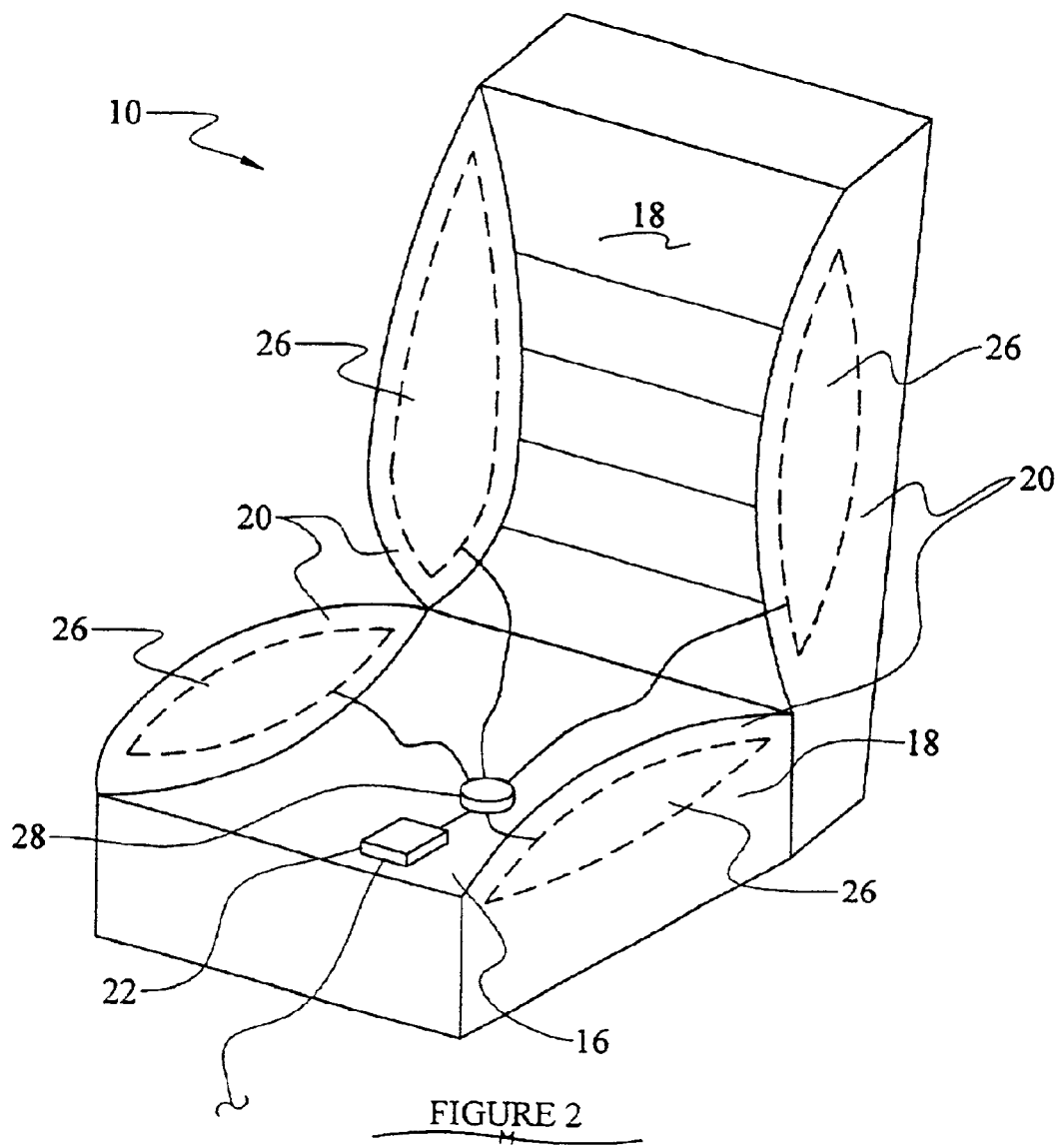
FIG. 2 is a perspective view of a seating system of the preferred embodiment.

As shown in FIGS. 1 and 2, the preferred embodiment includes a seating system 10 and a shared sensor 12 for a vehicle 14. The seating system 10, which functions to support a passenger or driver of the vehicle 14, includes a seat section 16 and a back section 18, adjustable bolsters 20 coupled to the seat section 16 and the back section 18, and a control unit 22 coupled to the adjustable bolsters 20. The shared sensor 12, which functions to collect and transmit vehicle data, is coupled to the control unit 22 of the seating system and to another vehicle system 24 in the vehicle 14. Although the seating system 10 and the shared sensor of the preferred embodiment have been specifically designed for a vehicle, they may be designed and made for other suitable environments, such as a watercraft or an aircraft.

As shown in FIG. 2, the seat section 16 and the back section 18 of the seating system 10, which function to support the body of the passenger or driver, are preferably made in a conventional manner, which includes providing a metal frame, a foam cushion, and a cloth or leather trim (not shown). The seat section 16 and the back section 18 may alternatively be made in any suitable manner. The back section 18 is preferably connected to the seat section 16 with a conventional angle-adjustable mechanism (not shown), but may alternatively be connected with any suitable device. Likewise, the seat section 16 is preferably connected to the vehicle with a conventional position-adjustable mechanism (not shown), but may alternatively be connected with any suitable device.

The adjustable bolsters 20 of the seating system 10, which functions to provide side support for the passenger or driver during a situation of lateral acceleration, are preferably made in a conventional manner, which includes an inflatable bladder 26 and a pneumatic pump 28. The adjustable bolster 20 may alternatively be made in any suitable manner, such as with a bladder inflatable by a hydraulic pump or with a paddle adjustable with a motor. The inflatable bladder 26 is preferably connected to the outer edges of the seat section 16 and to the outer edges of the back section 18 with conventional fasteners (not shown), but may alternatively be connected to the seat section 16 and the back section 18 with any suitable fastener. The seating system 10 preferably includes four adjustable bolsters 20, but may alternatively include one or more adjustable bolsters 20 at any suitable location. The pneumatic pump 28 is preferably located under the seat section 16 of the seating system 10, but may alternatively be located in any suitable location in the vehicle.

The control unit 22 of the seating system 10, which functions to receive and process vehicle data from the shared sensor and to output an appropriate signal to the adjustable bolsters 20, is preferably made in a conventional manner, which includes a microprocessor. The control unit 22 may alternatively be made in any other suitable manner. The control unit 22 is preferably located within the seat section 16 of the seating system 10, but may alternatively be located in any suitable location in the vehicle.

The seating system of an alternative embodiment may include a manual switch (not shown). The manual switch may function to receive a manual input from the passenger or driver in the seating system. In this alternative embodiment, the control unit may also be connected to the manual switch and may also be adapted to receive and process the manual signal and the vehicle data. With this feature, the passenger or driver in the seating system may override the automatic positioning of the adjustable bolster by the control unit.

As shown in FIG. 1, the shared sensor 12 of the preferred embodiment is coupled to the control unit 22 of the seating system 10 and to another system in the vehicle 14. The shared sensor 12 functions to collect vehicle data, such as lateral acceleration data or yaw rate data, and to transmit the vehicle data to the control unit 22 of the seating system 10 and to the other vehicle system 24 in the vehicle 14. Although the seating system 10 and the other vehicle system 24 controls different aspects of the vehicle 14, they both use the vehicle data. The shared sensor 12 is preferably made in a conventional manner, which includes sensors, wires, and a power source, but may alternatively be made in any suitable manner. The shared sensor 12 is preferably supplied to and installed by the Original Equipment Manufacturer ("OEM") of the vehicle 14 with the other vehicle system 24. The shared sensor 12 may alternative be supplied to and installed with the seating system 10, or as an individual system. The shared sensor 12 may be installed in any suitable location in the vehicle 14.

In the preferred embodiment, the vehicle data collected by the shared sensor 12 includes lateral acceleration data. In this embodiment, the shared sensor 12 is preferably a conventional lateral accelerometer, but may alternatively be any suitable device that measures lateral acceleration. In an alternative embodiment, the vehicle data includes vehicle speed data and steering wheel angle data. In this embodiment, the shared sensor 12 is preferably a conventional vehicle speedometer and a conventional steering wheel angle sensor, but may alternatively be any suitable device that measures vehicle speed and steering wheel angle. In a further alternative embodiment, the vehicle data includes yaw rate data. In this embodiment, the shared sensor 12 is preferably a conventional yaw rate sensor, but may alternatively be a suitable device that measures yaw rate data. The vehicle data, however, may include any suitable information that aids in the determination by the control unit 22 of a lateral force on the passenger or driver in the seating system 10 of the vehicle 14. For this reason, the shared sensor 12 may include any suitable device that would collect such information.

The shared sensor 12 of the preferred embodiment is connected to a vehicle dynamics system 30 of the vehicle 14. The vehicle dynamics system 30 is preferably adapted to adjust a braking subsystem, such as a conventional anti-lock braking system 32 ("ABS"). The braking subsystem receives and processes the vehicle data from the shared sensor 12 and controls the brakes of the vehicle 14 to retain or regain stability for the vehicle 14. The vehicle dynamics system 30 may alternatively be adapted to adjust other suitable subsystems, such as an electronic stability system. The shared sensor 12 of the preferred embodiment is also connected to a safety system 34 of the vehicle 14. The safety system 34 is preferably adapted to control an inflatable restraint subsystem, such as a side airbag device 36. The inflatable restraint subsystem receives and processes the vehicle data from the shared sensor 12 and decides whether to inflate the side airbag device 36. The safety system 34 may alternatively be adapted to control other suitable subsystems. Along with the control unit 22 of the seating system 10, the shared sensor 12 of alternative embodiments may be connected to one or more of the following: the vehicle dynamics system 30, the safety system 34, and any other suitable system of the vehicle 14.

As any person skilled in the art of seating systems will recognize from the previous detailed description and from the figures and claims, modifications and changes can be made to the preferred embodiments of the invention without departing from the scope of this invention defined in the following claims.

I claim:

1. A combination of a seating system and a shared sensor for a vehicle, comprising:
    a seating system having a seat section and a back section, an adjustable bolster coupled to one of said seat section and said back section, and a control unit coupled to said adjustable bolster, the control unit receiving vehicle data and activating said adjustable bolster; and
    a shared sensor coupled to said control unit of said seating system and to a second system in the vehicle, the shared sensor collecting vehicle data and transmitting vehicle data to the control unit and to the second system.

2. The combination of claim 1, wherein the second system is a vehicle dynamics system of the vehicle.

3. The combination of claim 2, wherein the vehicle dynamics system controls a braking subsystem of the vehicle dynamics system of the vehicle.

4. The combination of claim 1, wherein the second system is a safety system of the vehicle.

5. The combination of claim 4, wherein the safety system controls an inflatable restraint subsystem of the safety system of the vehicle.

6. The combination of claim 1, wherein the vehicle data includes lateral acceleration data.

7. The combination of claim 1, wherein the vehicle data includes vehicle speed data and steering wheel angle data.

8. The combination of claim 1, wherein the vehicle data includes yaw rate data.

9. A seating system for a vehicle comprising:
    a seat section and a back section;
    an adjustable bolster coupled to one of said seat section and said back section;
    a shared sensor; and
    a control unit coupled to said adjustable bolster and to the shared sensor to receive vehicle data from the shared sensor and to activate said adjustable bolster, the shared sensor further being coupled to a second system, the shared sensor transmitting vehicle data to the second system.

10. The seating system of claim 9, wherein the second system is a vehicle dynamics system of the vehicle.

11. The seating system of claim 10, wherein the vehicle dynamics system controls a braking subsystem of the vehicle dynamics system of the vehicle.

12. The seating system of claim 9, wherein the second system is a safety system of the vehicle.

13. The seating system of claim 12, wherein the safety system is controls an inflatable restraint subsystem of the safely system of the vehicle.

14. The seating system of claim 9, wherein the vehicle data includes lateral acceleration data.

15. The seating system of claim 9, wherein the vehicle data includes vehicle speed data steering wheel angle data.

16. The seating system of claim 9, wherein the vehicle data includes yaw rate data.

* * * * *